May 8, 1951　　　R. W. DOEG　　　2,552,310
PISTON-CONNECTING ROD ASSEMBLY
Filed Nov. 22, 1948　　　4 Sheets-Sheet 2
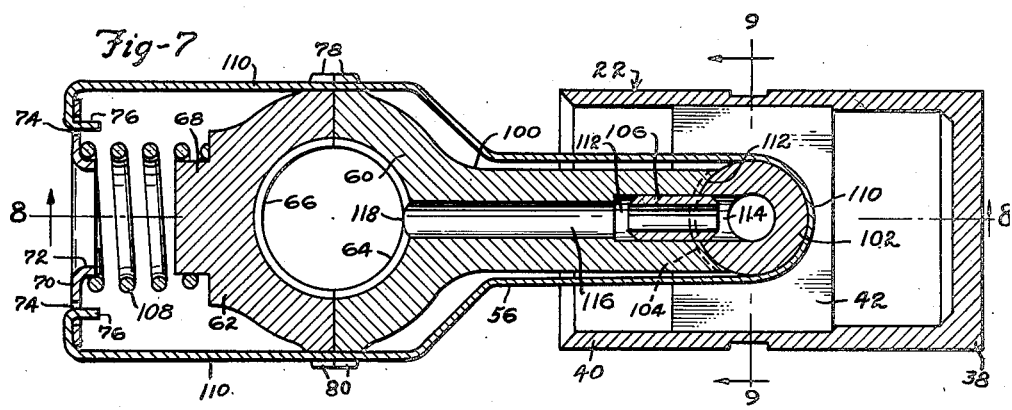
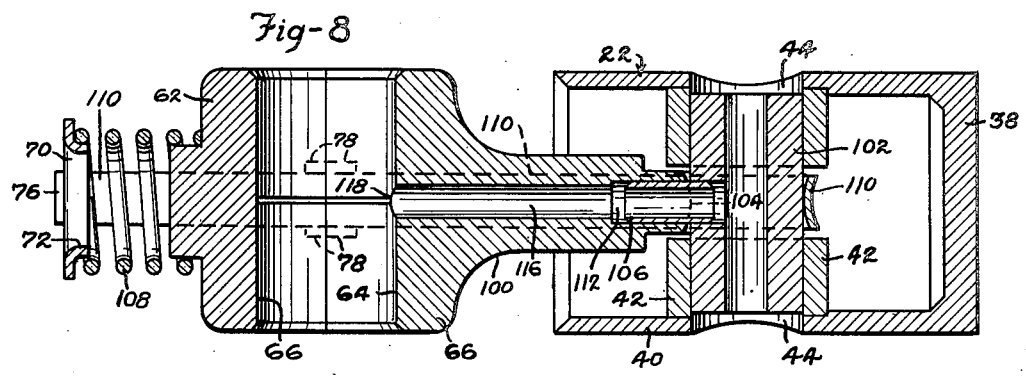
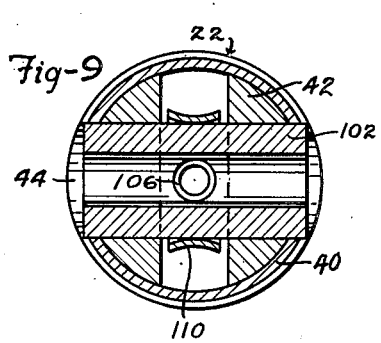
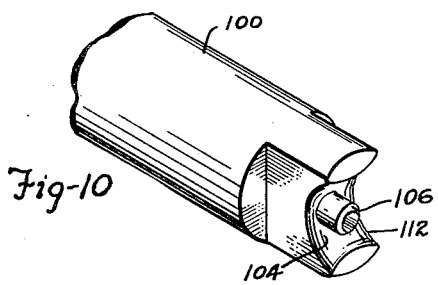
INVENTOR.
RALPH W. DOEG
BY
Ralph E. Baker
ATTORNEY May 8, 1951 R. W. DOEG 2,552,310
PISTON-CONNECTING ROD ASSEMBLY
Filed Nov. 22, 1948 4 Sheets-Sheet 3
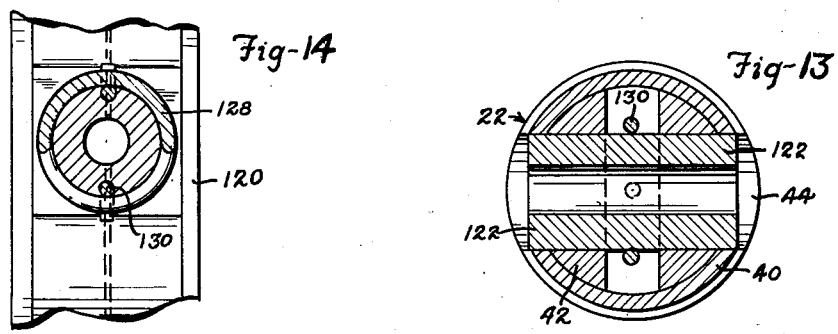
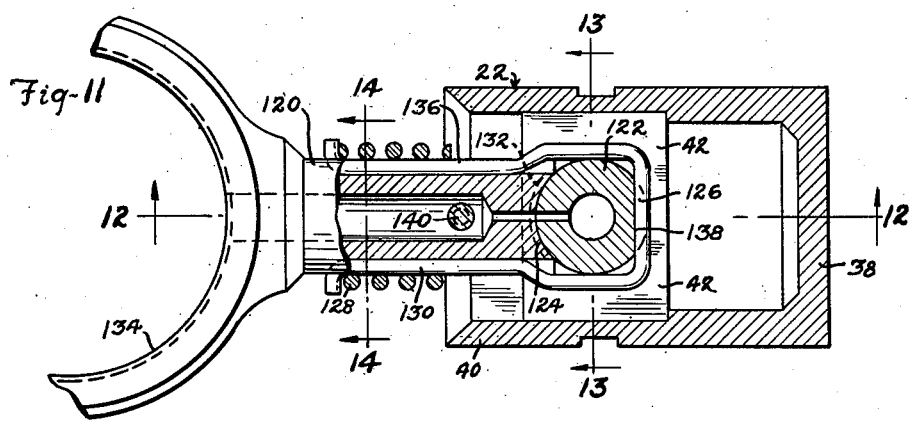
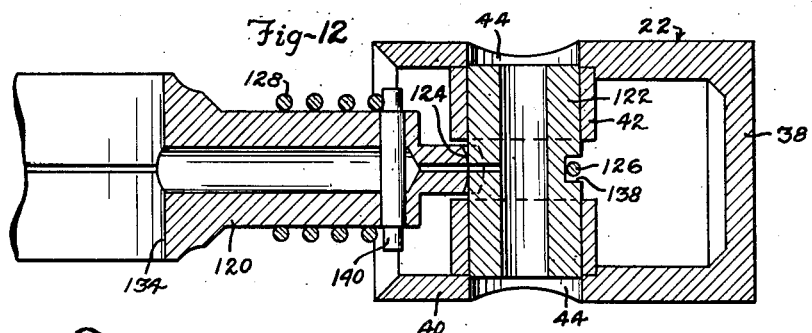
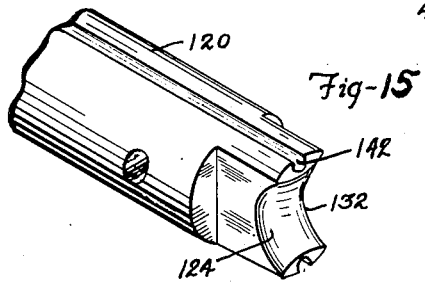
INVENTOR.
RALPH W. DOEG
BY
Ralph E. Barnes
ATTORNEY

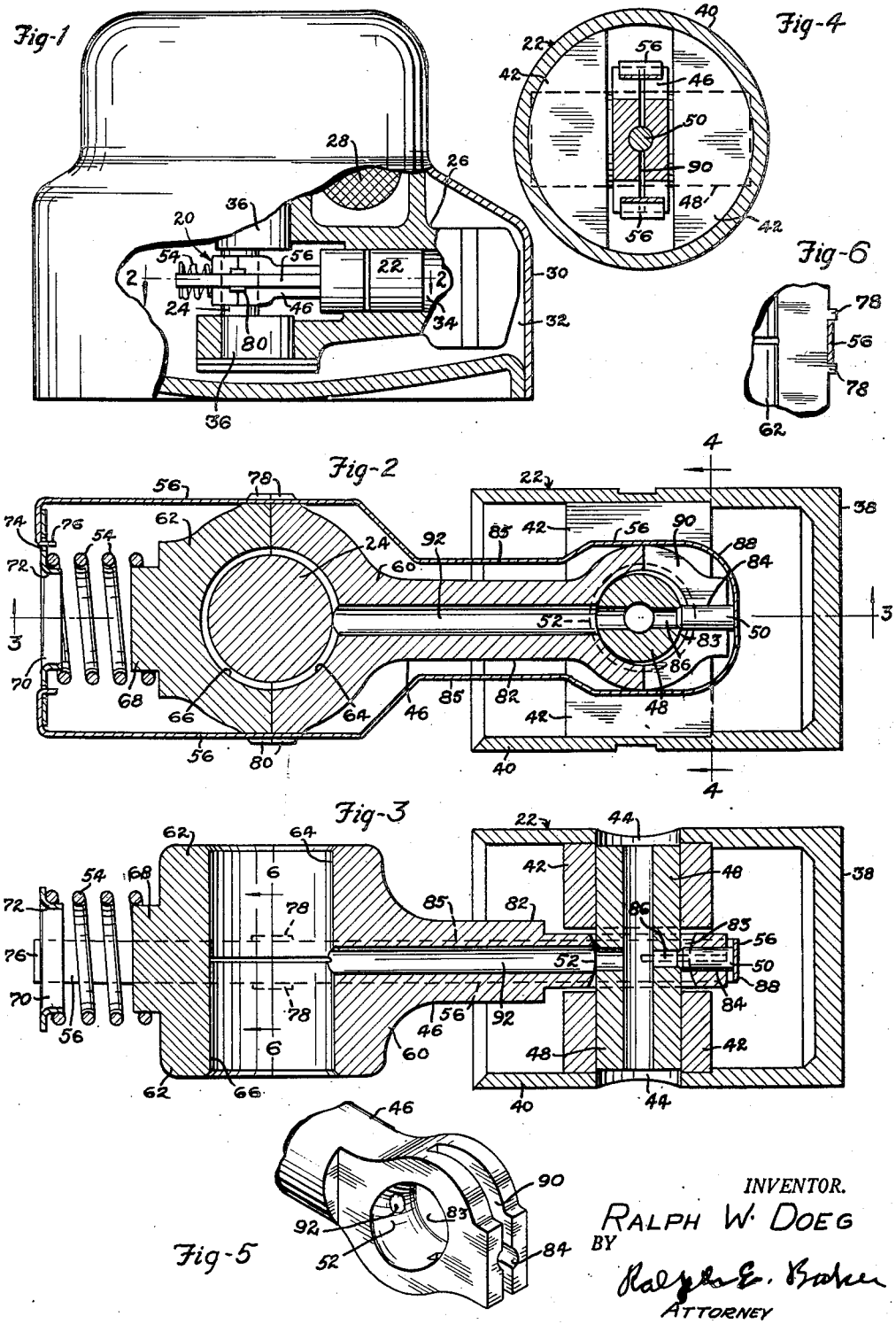

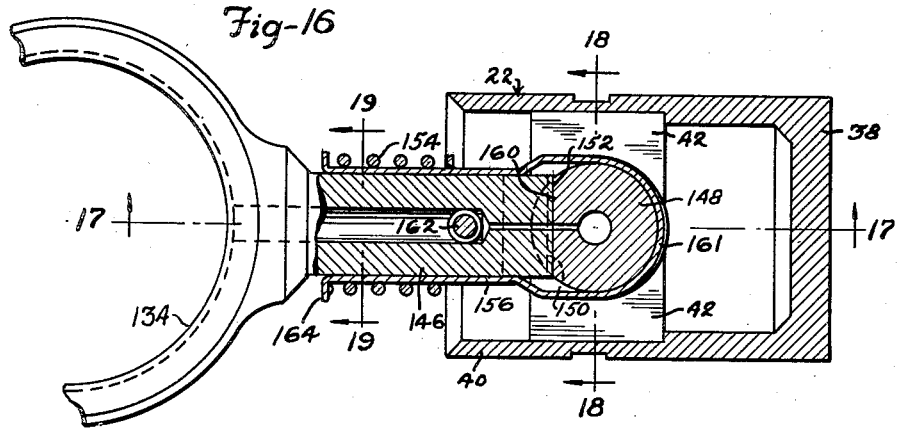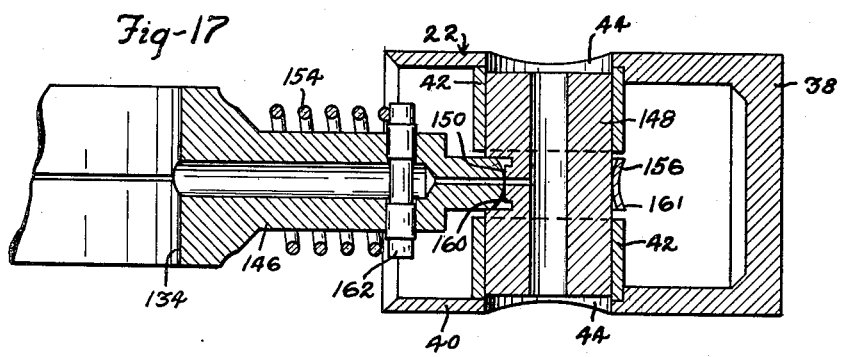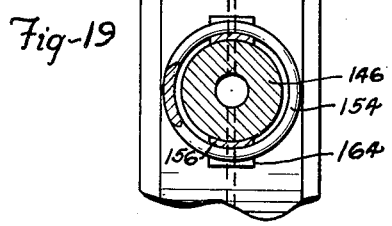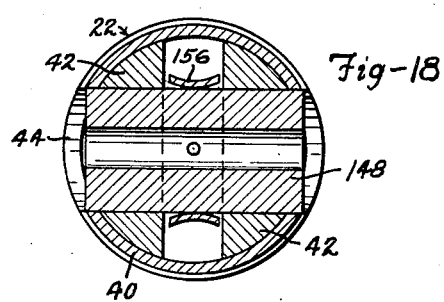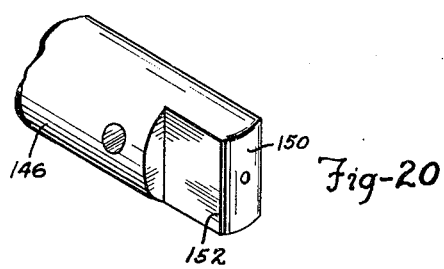

Patented May 8, 1951

2,552,310

UNITED STATES PATENT OFFICE 2,552,310

PISTON-CONNECTING ROD ASSEMBLY

Ralph W. Doeg, Detroit, Mich., assignor to Nash-Kelvinator Corporation, Detroit, Mich., a corporation of Maryland Application November 22, 1948, Serial No. 61,476

19 Claims. (Cl. 74—594)

This invention relates generally to piston-crank connections and more particularly to articulated or canting connections for operatively connecting a piston and its crank.

It is an object of the invention to provide an improved articulated or canting connection for operatively connecting a piston and its crank together in a manner such that the connection is positive for reciprocating the piston yet cants in response to slight side thrust on the piston to compensate therefor and prevent wear of the piston and piston bore.

Another object of the invention is to accomplish the above mentioned result by an improved, canting crank-piston connection which also includes wear take up between the parts.

Another object of the invention is to provide an improved universal connection for operatively connecting a piston and its crank together in such a manner as to acquire the advantages of an oscillatory wrist pin.

Another object of the invention is to provide a piston and crank connection of composite or articulated construction which facilitates assembly of the connection, piston and crank.

Another object of the invention resides in the arrangement of relatively canting parts of the composite connection and in the manner in which the parts are held in operative relationship to each other so as to compensate for any mis-alignment of the piston cylinder and its crank; to compensate for wear between the parts; and to facilitate assembly of the parts.

Further objects and advantages of the present invention will be apparent from the following description, reference being had to the accompanying drawings, wherein a preferred form of the present invention is clearly shown.

In the drawings:

Fig. 1 is an elevational view partly broken away and in section of a compressor including my improved piston-crank connection;

Fig. 2 is a sectional view of my piston-crank connection, taken along the line 2—2 of Fig. 1;

Fig. 3 is a sectional view of my piston-crank connection, taken along the lines 3—3 of Fig. 2;

Fig. 4 is a cross sectional view of the piston and my connection, taken along the line 4—4 of Fig. 2;

Fig. 5 is a fragmentary isometric view of a part of my piston-crank connection shown removed therefrom;

Fig. 6 is a fragmentary cross sectional view of the piston-crank connection, taken along the line 6—6 of Fig. 3;

Fig. 7 is a sectional view similar to Fig. 2, showing a modified form of my piston-crank connection;

Fig. 8 is a sectional view of the modification of Fig. 7, taken along the line 8—8 of Fig. 7;

Fig. 9 is a cross sectional view of the modified connection of Fig. 7, taken along the line 9—9 of Fig. 7;

Fig. 10 is a fragmentary isometric view of a part of the modified connection shown removed therefrom;

Fig. 11 is a view partly in elevation and partly in section of another modification of my piston-crank connection;

Fig. 12 is a sectional view of the piston-crank connection, taken along the line 12—12 of Fig. 11;

Fig. 13 is a cross sectional view of the piston-crank connection, taken along the line 13—13 of Fig. 11;

Fig. 14 is another cross sectional view of the piston-crank connection taken along the line 14—14 of Fig. 11;

Fig. 15 is a fragmentary isometric view of a part of the piston-crank connection shown removed therefrom;

Fig. 16 is a view partly in elevation and partly in section of another modification of my piston-crank connection;

Fig. 17 is a sectional view of the piston-crank connection, taken along the line 17—17 of Fig. 16;

Fig. 18 is a cross sectional view of the piston-crank connection taken along the line 18—18 of Fig. 16;

Fig. 19 is another cross sectional view of the piston-crank connection taken along the line 19—19 of Fig. 16; and Fig. 20 is a fragmentary isometric view of a part of the piston-crank connection shown removed therefrom.

Referring to the drawings by characters of reference and first to Figs. 1 to 5 inclusive, my improved piston-crank connection, designated generally by the numeral 20, is shown by way of illustrating the invention as operatively connecting a piston 22 and a crank 24 of a refrigerant motor-compressor unit although it will be apparent that my connection may be used to connect a piston and crank of any kind of machine. The motor-compressor unit is of the type commonly employed in household refrigerating apparatus and comprises generally a compressor 26 and an electric, compressor driving motor 28. A fluid tight casing 30 encloses the compressor 26 and motor 28 and, as is well known, provides a refrigerant low pressure chamber 32. Within the pressure chamber 32, the body of the compressor 26, which may be a casting, has a horizontal bore 34 to receive the piston 22 and has substantially vertically aligned bearings 36 to receive the shaft of the crank 24. As is generally known, manufacturing inaccuracies of a crank, piston, piston bore etc., cause side thrusts on the piston and resultant rapid wear of the piston and its bore which is, of course, detrimental to the efficiency of the machine. To overcome this objection, I provide the piston-crank connection 20 which as a composite or articulated connection cants in response to slight side thrust on the piston or offers only slight resistance to canting in planes transverse to the plane of rotation of the crank, while at the same time provides a positive connection between the crank and piston.

The piston 22 is of the usual type having a head 38 and a skirt 40. Secured to and within the skirt 40 is a pair of wrist pin receiving bosses 42 which are axially aligned with each other and with bores or apertures 44 in the piston skirt. The bosses 42 may be made separately from the piston and may be brazed or be otherwise suitably secured to the piston skirt 40 after which the wrist pin receiving bores may be drilled or be otherwise provided in the bosses.

My piston-crank connection comprises, in general, a connecting member or rod 46, a connecting member or wrist pin 48, a locking member or pin 50, a fulcrum member 52, a thrust member or spring 54, and a thrust transmitting member or strap 56. One end of the rod 46 is connected to the crank 24 and the other end of the rod 46 is connected to the piston 22 by the wrist pin 48, locking pin 50, fulcrum 52, spring 54, and the strap 56. On the piston end of the rod 46, within the piston skirt, is carried the wrist pin 48, fulcrum member 52, and the locking pin 50. The wrist pin 48 extends transversely to the rod 46 to form therewith a T-shaped articulated connecting member. Opposite end portions of the wrist pin 48 are received in the piston bosses for oscillation therein, the piston bosses 42 providing a large bearing surface for the wrist pin.

The fulcrum 52 is located between the crank end of the rod 46 and the wrist pin 48 and connects these parts for positive reciprocating action of the piston while at the same time allowing for canting action in response to slight side thrust on the piston. The locking pin 50 is located on the other side of the wrist pin 48 from the fulcrum 52 and locks the wrist pin and rod together for reciprocating action or prevents relative movement between the fulcrum and the wrist pin other than canting movement. The spring 54, under compression between the crank end of the rod 46 and the strap 56, urges the locking pin 50 into locking relationship with the wrist pin 48 and through the locking pin urges the wrist pin 48 toward and holds it against the fulcrum member 52.

In the compressor shown in Fig. 1, it will be noted that the crank bearings 36 are of larger diameter than the diameter of the crank 24 and so in order to assemble my connection 20 with the crank, I have made the connecting rod 46 of composite or sectional construction comprising, a main section 60 and an end section 62. These sections 60, 62 have cooperating semicircular, strap or bearing portions 64, 66 respectively which together encircle and receive the crank 24 and are held thereto by the action of the spring 54. The spring 54 may be of the helical coil type and may have one end engaging over a spring retainer or boss 68 formed on the end of rod section 62 and the other end abutting a plate 70 to which ends of the straps 56 are attached. As shown, for example, in Fig. 2, the plate 70 may be formed with a spring retainer or boss 72 to engage the adjacent end of the spring 54 and outwardly of this boss 72, the plate 70 may be provided with apertures 74 to receive hooked ends 76 of the strap 56. Adjacent the opposed surfaces of the rod sections 60, 62, I provide oppositely disposed strap retainers 78. These strap retainers 78 may be made by forming spaced lugs 80 on and integral with the rod sections adjacent their opposed surfaces to receive the strap 56 therebetween so that the strap functions to maintain the rod sections in alignment with each other and in proper position along the crank.

The other or piston end, as at 82, of the rod member 60 is positioned between the opposed inner ends of the piston bosses 42 in surrounding relationship to the wrist pin 48. The wrist pin receiving opening, as at 83 in this end of the rod 60 may be of larger diameter than necessary to fit over the wrist pin 48, since the periphery of the wrist pin engages only against the rod carried fulcrum 52. This fulcrum 52 is provided by rounding or making cylindrical in form the inner surface of the rod strap, as illustrated, for example, in Figs. 3 and 5. It will be noted that the curved fulcrum surface is curved in the direction of the axis of the wrist pin 48 so as to allow relative canting action between the rod 46 and the wrist pin in planes transverse to the axis of the piston bore.

A bore 84 is provided in the wrist pin end of the rod 46 to receive loosely the locking pin 50. This bore 84 may extend coaxially with the longitudinal axis of the rod 46 and intersects the strap or rod bearing opening 83 so that the inner end of the locking pin 50 may lockingly engage in a keeper or radially disposed bore 86 provided in the wrist pin 48. An outer end of the locking pin 50 projects outwardly beyond the end of the rod 46 for engagement by the strap 56. This strap 56 is generally U-shape having opposite sides 85 and a connecting portion or web 88. The strap sides 85 extend along the rod from the spring, at the crank end thereof, to the piston end of the rod where the strap web 88 engages against the outer end of the locking pin 50. As it is desirable that the locking pin 50 be free in the bore 84, so as to offer little resistance to the spring and to allow canting of the connecting rod, I have provided a saw slot 90 in the end of the rod which axially intersects the pin bore 84 and transversely intersects the rod bore 83 for the purpose of dampening any noise which the pin may make in its side thrust against the wall of its bore 84. Longitudinally of the rod 46, a lubricant passage or bore 92 may be provided therein to connect the crank bore and the wrist pin strap; the bore 92 intersecting the rounded surface of the fulcrum. The wrist pin locking bore 86 preferably extends radially through the wrist pin and aligns with the lubricant passage or bore 92 or is in alignment with the fulcrum and rod.

Referring now to Figs. 7 to 10 inclusive, the piston-crank connection of this modification comprises, in general, a connecting member or rod 100, a connecting member or oscillatory wrist pin 102, a fulcrum member 104, a locking member or pin 106, a thrust member or spring 108, and a thrust transmitting member or strap 110. Other parts of the present piston-rod connection are the same as the previously described connection, and therefor like parts have been given like numerals to avoid repetitious description. In the modification, the connecting rod 100 is provided on its piston end with an arcuate socket 112 which is substantially complementary to the cylindrical periphery of the wrist pin 102. This socket 112 is formed with a rounded or cylindrically convex surface which, with the arc of the socket, forms a spheroidal surface for the fulcrum 104. Carried by the rod 100 and projecting from the fulcrum 104 is the locking pin 106 which, as in the previously described form of the invention, functions to lock the rod and wrist pin together so that these parts will oscillate together. Thus, unlike the previously described connection of Figs. 1 to 6 inclusive, the locking pin 106 of the modification is on the same side of the wrist pin 102 as the fulcrum 104. The locking pin 106 may be press fitted or be otherwise secured in a longitudinal bore 112 which may be provided in the rod 100 and may intersect or open through the surface of the spheroidal fulcrum 104. The outer end of the locking pin 106 engages in a radially extending bore 114 provided in the wrist pin 102 to lock the parts for movement together by the crank. In order that the connecting rod 100 and the wrist pin 102 may cant in response to misalignment or inaccuracies of the connected and associated parts, the locking pin 106 is provided with a loose fit in the wrist pin bore 112. Also, the locking pin 106 functions as a stop to limit end travel of the wrist pen 102 in the piston bosses 42. The strap 110 is arranged to extend from the spring 108 along the rod 100 and over the wrist pin 102 in engagement with the periphery thereof opposite the fulcrum and locking pin. Thus, the spring 108 acts through the strap 110 to urge the wrist pin 102 against the rod carried fulcrum 104 and also to urge the wrist pin 102 and locking pin 106 into locking relationship with each other. A longitudinally extending lubricant passage or bore 116 may be provided to connect the rod crank bearing, as at 118, with the bearing surface of the oscillatory wrist pin 102 through the locking pin 106.

In the modification shown by Figs. 11 to 15, inclusive, my piston rod connection comprises, in general, a connecting member or rod 120, a connecting member or wrist pin 122, a fulcrum 124, a locking member or key 126, a thrust member or spring 128, and a thrust transmitting member or strap 130. Other parts of the piston rod connection and of the piston are similar to the previously described forms of the invention, and therefor like parts are designated by like numerals. On the piston end of the connecting rod 120, a socket 132 is provided which abuts and is complementary to the periphery of the wrist pin 122. As is shown more clearly in Fig. 15, the socket is formed with a rounded or cylindrical surface portion to provide the fulcrum 124. The fulcrum surface is rounded or curved longitudinally of the wrist pin so as to provide for canting of the rod in planes substantially transverse to the plane of oscillation of the wrist pin.

The present type of connecting rod may be made of one piece having a large bearing 134 to receive crank shafts of the type having cranks of larger diameter than the diameters of the crankshaft bearings. The force transmitting member or strap 130 may be of general U-shape and may be made of stiff wire or of other suitable material. Opposite side portions, as at 136, of the U-shaped wire strap 130 extend longitudinally of the rod 120 and have a connecting end portion which also functions as the locking key 126 for locking the rod and wrist pin together. In the periphery of the wrist pin 122 on the other side thereof from the fulcrum 124, a transverse keyway or groove 138 is provided to receive the locking portion 126 of the strap and cooperates therewith in a lever action to prevent any oscillating movement between the wrist pin and the rod on the fulcrum 124. As shown in Fig. 11, the groove 138 is cut square to the longitudinal axis of the rod to attain lever arms through which the spring 128 acts to oppose relative oscillatory movement of the rod and wrist pin. Opposite ends of the wire strap 130 may be out-turned to provide an abutment for one end of the spring 128 and a transverse pin 140 is provided in the rod 120 to serve as an abutment for the other end of the spring. The abutment pin 140 is secured in a transverse bore in the rod, between the spring and the fulcrum 124. Under compression between the ends of the strap 130 and the abutment pin 140, the spring 128 acts to urge and hold the wrist pin 122 against the fulcrum 124 and also holds the locking portion 126 of the strap in its groove 138 to lock the wrist pin and rod together for oscillation as a unitary structure. Oppositely disposed grooves 142 are provided in the rod 120, longitudinally thereof, to receive the side members 136 of the strap 130. The provision of the retaining grooves 142 in the rod 120 assures retention of the strap in its proper relationship to the axis of the rod 120. In addition to holding the wrist pin 122 on the fulcrum 124 and holding the key 126 in groove 138, the coil spring 128 fits over or surrounds the strap side members 136 and thus also functions to retain the strap sides in their retaining grooves 142.

In the modification of Figs. 16 to 20 inclusive, my piston-crank connection comprises, as in the other forms, a connecting member or rod 146, a connecting member or wrist pin 148, a fulcrum member 150, a locking member 152, a thrust member or spring 154, and a thrust transmitting member or strap 156. In this form of the invention, the piston end of the rod 146 is rounded or made convex to provide the fulcrum 150. The cylindrical fulcrum 150 extends transversely to the axis of the wrist pin 148 and engages a flat abutment surface 160 on the wrist pin to lock the parts together or to prevent movement of the wrist pin on the fulcrum 150 in the plane of reciprocation of the piston. The strap 156 is of general U-shape having opposite sides extending along the rod 146 and has a connecting end portion 161 which is rounded to conform to the periphery of the wrist pin 148. Whereas in the modification of Figs. 11 to 15 inclusive, the locking means 126 is carried by the strap on the other side of the wrist pin from the fulcrum; it will be seen that in the modification of Figs. 16 to 20 the locking means is carried by the rod 146 on the same side of the wrist pin axis as the fulcrum 150. As shown in Fig. 17, the flat abutment surface 160 on the wrist pin 148 is recessed to receive an end portion of the rod 146 which limits end movement of the wrist pin in the cylinder. Adjacent the piston end of the rod 146, a transverse pin 162 is carried by the rod to provide an abutment for one end of the helical coil spring 154 and the strap may be provided with outturned end portions for abutment by the other end of the spring.

In assembling the piston 22, crank 24 and my piston-crank connection 20 of Figs. 1 to 5 inclusive, the piston end of the connecting rod 46 is positioned between the piston bosses 42 and the wrist pin 48 is inserted to connect the parts together. Also, the locking pin 50 is inserted in the end of the connecting rod 46 and the strap is positioned in engagement with the outer end of the locking pin. This sub-assembly is then inserted into the piston bore 34 from the outer end and pushed inwardly until the semi-circular bearing of the main rod section 60 engages the crank 24. The end section 62 of the connecting rod is then positioned against the crank 24 to complete the bearing or strap of the rod and the spring 54 is compressed between the ends of the strap 56 and the adjacent end of the rod. Thus, the force of the spring 54 acts through the strap 56 to hold the locking pin 50 in locking relationship with the wrist pin 48 and through the locking pin acts to hold the wrist pin 48 against the rod carried fulcrum 52. The locking pin 50 locks the wrist pin 48 and the connecting rod 46 together so that these parts will oscillate together, but has a loose fit in the bore 84 to allow limiting canting of the connecting rod and wrist pin. Assembly of my piston-crank connection of Figs. 7 to 10 inclusive is substantially the same as the form of Figs. 1 to 6 with the exception that the locking pin 106 is on the same side of the wrist pin 102 as the fulcrum 104 and the strap 110 engages directly against the periphery of the wrist pin. In assembling the piston-crank connection of Fig. 14, the piston 22 and the connecting rod 120 are connected together on the fulcrum 124 by the spring 128 acting through the strap 130. An intermediate portion or locking key 126 of, or carried by, the strap is positioned in the keyway or groove 138 in the wrist pin so as to lock the rod to the wrist pin except for relative canting action of the parts. The spring 128 is fitted over or surrounds the connecting rod 120 and also holds the strap in the retaining grooves 142 in the rod member. The assembly connection and piston as a unit is positioned in the crankcase and the piston is pressed into its cylinder bore from the inner end thereof after which the crankshaft is lowered through the rod bearing or strap until the crank engages therein. The modification of Figs. 16 to 20 is assembled with the piston and crank similarly to assembly of the connection of Fig. 14, above described.

From the foregoing description it will be noted that I have provided improved piston-crank connections which will cant in response to side thrust thereon so as to decrease wear of pistons, cylinder walls, and associated parts. It will further be noted that while my piston-crank connections are adapted to cant they nevertheless provide a positive connection by reason of the connecting rod-wrist pin locking means. Further, I have provided piston-crank connections in which the parts are all held together by a spring so located as to effect wear take-up between the parts and to facilitate assembly. In addition, I have provided a strap to facilitate the assembly of a wrist pin within a piston and a spring externally thereof, and I have arranged to utilize the strap to lock parts of the piston-crank connection together, as well as to transmit the spring force to hold the parts together. Another important advantage of my canting connecting rod resides in the provision of the fulcrum and its arrangement such that canting action is sensitively responsive to side thrust on the piston or to mis-alignment, or inaccuracies, of parts.

Although preferred and modified forms have been illustrated, and described in detail, it will be apparent to those skilled in the art that various other modifications may be made therein without departing from the spirit of the invention or from the scope of the appended claims.

I claim:

1. A piston-crank connection comprising, a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by one of said members and engaged by the other of said members, said members canting relatively on said fulcrum, locking means carried by one of said members locking the other of said members thereto for oscillation together, and a thrust member acting on said connecting rod member and on said wrist pin member holding the other of said members on said fulcrum.

2. A piston-crank connection comprising, a connecting rod member having means adjacent one end thereof for connection to the crank, a wrist pin adjacent the other end of said rod for oscillatory connection to the piston, said wrist pin member being arranged with its axis of oscillation substantially transverse to said connecting rod member, a fulcrum interposed between said members and carried by one of said members, a thrust member on the other side of said fulcrum from said wrist pin urging said wrist pin against said fulcrum, and a thrust transmitting member extending from said thrust member along said rod member over said wrist pin member.

3. A piston-crank connection comprising, a connecting rod member having means adjacent one end thereof for connection to the crank, a wrist pin member adjacent the other end of said connecting rod member for oscillatory connection with the piston, said wrist pin being arranged with its axis of oscillation substantially transverse to said connecting rod member, a fulcrum carried by one of said members and engaged by the other of said members, said members canting relatively about said fulcrum in response to side thrust on said connecting rod member, locking means carried by one of said members and locking the other of said members thereto for oscillation together, a thrust member on the other side of said fulcrum from said wrist pin acting on said connecting rod member and on said wrist pin holding the other of said members against said fulcrum, and a thrust transmitting member operatively connecting said thrust member and said wrist pin member.

4. A piston-crank connection comprising, a connecting rod member having means adjacent one end thereof for connection to the crank, a wrist pin member adjacent the other end of said connecting rod member for oscillatory connection to the piston, a fulcrum carried by one of said members engaged by the other of said members, said members canting about said fulcrum in response to side thrust on said connecting rod member, locking means carried by one of said members on the other side of said wrist pin from said fulcrum and locking the other of said members thereto for oscillation together, and a thrust member acting on said connecting rod member and on said wrist pin member to hold said fulcrum in contact with said one member.

5. A piston-crank connection comprising, a connecting rod member having means adjacent one end thereof for connection to the crank, a wrist pin member adjacent the other end of said connecting rod member for oscillatory connection with the piston, said wrist pin member being arranged with its axis of oscillation substantially transverse to said connecting rod member, a fulcrum carried by one of said members and engaged by the other of said members, said members canting about said fulcrum, a spring on the opposite side of said fulcrum from said wrist pin acting against said connecting rod member and against said wrist pin member to hold said other member against said fulcrum, a strap extending from said spring along said connecting rod member over said wrist pin member and transmitting the spring force to said wrist pin member, and locking means carried by said connecting rod member on the other side of said wrist pin member from said fulcrum locking said wrist pin member to said connecting rod member for oscillation together.

6. A piston-crank connection comprising, a connecting rod member having means adjacent one end thereof for connection to the crank, a wrist pin member adjacent the other end of said connecting rod member for oscillatory connection with the piston, said wrist pin member being arranged with its axis of oscillation substantially transverse to said connecting rod member, a fulcrum carried by said connecting rod member engaged by the periphery of said wrist pin member, a locking pin supported loosely in a bore in said connecting rod member on the other side of said wrist pin member from said fulcrum, said locking pin engaging said wrist pin member to lock said wrist pin member and said connecting rod member for oscillation together, a spring on the other side of said fulcrum from said wrist pin acting against said connecting rod member and against said locking pin urging said wrist pin member against said fulcrum, and a strap operatively connecting said spring and said locking pin.

7. A piston-crank connection comprising, a connecting rod member having means adjacent one end thereof for connection with the crank and having an opening adjacent the other end thereof, a longitudinal bore in the said other end of said rod member intersecting said opening, a wrist pin for oscillatory connection with the piston, said wrist pin extending through said opening with the wrist pin axis of oscillation substantially transverse to said connecting rod member, a fulcrum carried by said connecting rod member within said opening and between said wrist pin and the crank end of said connecting rod, a locking pin loosely received in said bore in locking engagement with said wrist pin member and having an outer end, a strap extending longitudinally of said connecting rod member engaging the outer end of said locking pin, and a spring on the other side of said fulcrum from said wrist pin member acting on said connecting rod member and on said locking pin to urge said wrist pin member against said fulcrum and also holding said locking pin in locking engagement with said wrist pin member.

8. A piston-crank connection comprising, a connecting rod member having means adjacent one end thereof for connection with the crank and having an opening adjacent the other end thereof, a longitudinal bore in the said other end of said rod member intersecting said opening, a wrist pin for oscillatory connection with the piston, said wrist pin extending through said opening with the wrist pin axis of oscillation substantially transverse to said connecting rod member, a fulcrum carried by said connecting rod member within said opening and between said wrist pin and the crank end of said connecting rod, a locking pin loosely received in said bore in locking engagement with said wrist pin member and having an outer end, a strap extending longitudinally of said connecting rod member engaging the outer end of said locking pin, a spring on the other side of said fulcrum from said wrist pin member acting on said connecting rod member and on said locking pin to urge said wrist pin member against said fulcrum and also holding said locking pin in locking engagement with said wrist pin member, and a slot in the other end of said connecting rod member longitudinally intersecting said bore and transversely intersecting said opening.

9. A piston-crank connection comprising, a connecting rod member having means adjacent one end thereof for connection to said connecting rod member, a wrist pin member carried by the crank adjacent the other end thereof for oscillatory connection with the piston, said wrist pin member being arranged with its axis substantially transverse to said connecting rod member, a fulcrum carried by one of said members substantially in longitudinal alignment with said connecting rod member and engaged by the other of said members, a locking pin carried by said connecting rod member substantially in alignment with said fulcrum and said connecting rod member, said locking pin engaging and locking said wrist pin member to said connecting rod member for oscillation together, a coil spring surrounding said connecting rod member on the other side of said fulcrum from said wrist pin member acting on said connecting rod member, and a thrust transmitting member operatively connecting said spring and said wrist pin member to urge said other member against said fulcrum.

10. A piston-crank connection comprising a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by one of said members and engaged by the other of said members, said members canting relatively about said fulcrum, a spring on the other side of said fulcrum from said wrist pin member acting on said connecting rod member, a thrust transmitting member operatively connecting said spring and said other member to urge the latter against said fulcrum, and locking means carried by said connecting rod member on the same side of said wrist pin member as said fulcrum connecting said members for oscillation together.

11. A piston-crank connection comprising, a connecting rod member having means adjacent one end thereof for connection to the crank, a wrist pin member adjacent the other end of said connecting rod member having an oscillatory connection with the piston, said wrist pin member being arranged with its axis of oscillation substantially transverse to said connecting rod member, a socket in one of said members, a locking pin carried by the other of said members engaging and locking said one member thereto for oscillation together, a fulcrum in said socket carried by said one member for engagement by said other member, said members canting about said fulcrum, a spring on the other side of said fulcrum from said wrist pin acting on said connecting rod member, and a thrust transmitting member operatively connecting said spring and said other member to urge said other member against said fulcrum.

12. A piston-crank connection comprising, a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by and adjacent the other end of said connecting rod member, said fulcrum being elongated laterally, a substantially flat abutment surface on said wrist pin member engaged by said fulcrum and cooperating therewith to lock said members together for oscillation together about the axis of said wrist pin member, said members canting relatively about said fulcrum, a spring on the other side of said fulcrum from said wrist pin member acting on said connecting rod member, and a strap operatively connecting said spring and said wrist pin member to urge said wrist pin member against said fulcrum.

13. A piston-crank connection comprising, a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by and adjacent the other end of said connecting rod member engaging said wrist pin member, a spring on the other side of side fulcrum from said wrist pin member acting on said connecting rod member, and a strap extending from said spring along said connecting rod member and over and engaging the periphery of said wrist pin member to transmit the force of the spring against and urge said wrist pin member into engagement with said fulcrum.

14. A piston-crank connection comprising, a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by said connecting rod member adjacent said other end and engaging said wrist pin member, said connecting rod member and said wrist pin member canting relatively about said fulcrum, a spring on the other side of said fulcrum from said wrist pin member acting on said connecting rod member, a transverse keyway in said wrist pin member, a strap extending from said spring along said connecting rod member and over said wrist pin to transmit the spring force to said wrist pin, and a key carried by said strap engaging in said keyway to lock said members together against relative oscillatory movement.

15. A piston-crank connection comprising, a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by said connecting rod member adjacent said other end and engaging said wrist pin member, said members canting about said fulcrum, a spring on the other side of said fulcrum from said wrist pin acting on said connecting rod member, a transverse keyway in said wrist pin member, a strap extending from said spring along said connecting rod member and over said wrist pin to transmit the spring force to said wrist pin, a key carried by said strap engaging in said keyway to lock said members together against relative oscillatory movement, a longitudinal keyway in said connecting rod member, and a key carried by said strap engaging in said second keyway.

16. A piston-crank connection comprising, a connecting rod member having means adjacent one end thereof for connection to the crank, a wrist pin member adjacent the other end of said connecting rod member for oscillatory connection to the piston, said wrist pin member being arranged with its axis of oscillation substantially transverse to said connecting rod member, a fulcrum carried by said connecting rod member adjacent said other end and engaging said wrist pin member, said member canting about said fulcrum, a spring on the other side of said fulcrum from said wrist pin acting against said connecting rod member, a transverse keyway in said wrist pin member, a strap extending from said spring along said connecting rod member and over said wrist pin to transit the spring force to and urge said wrist pin against said fulcrum, a key carried by said strap engaging in said keyway to lock said members together against relative oscillatory movement, a longitudinal keyway in said connecting rod member, a key carried by said strap engaging in said keyway, and said spring surrounding said connecting rod member and strap holding said second named key in said longitudinal keyway.

17. A piston-crank connection comprising, a main section rod member, an end section rod member, said rod members having semi-circular cooperable portions of a bearing to receive the crank, a fulcrum on the main rod member adjacent the end thereof, an oscillatory wrist pin member resting against said fulcrum, said rod members and said wrist pin member canting on said fulcrum, locking means holding said main rod member and said wrist pin together for oscillatory movement, a strap extending around said wrist pin along said rod members, and a spring acting on said end section rod member and on said strap holding said sections together and also urging said wrist pin against said fulcrum.

18. A piston-crank connection comprising, a main section rod member, an end section rod member, said rod members having semi-circular cooperable portions of a bearing to receive the crank, a fulcrum on the main rod member adjacent the end thereof, an oscillatory wrist pin member resting against said fulcrum, said main rod member and said wrist pin member being relative cantable in a plane substantially transverse to the plane of oscillation of said wrist pin member but being oscillatory together about the axis of said wrist pin, locking means holding said main rod member and said wrist pin member together for oscillatory movement, a strap extending around said wrist pin member along said rod members, and a spring acting on said end section rod member and on said strap holding said sections together and also urging said wrist pin member against said fulcrum.

19. A piston-crank connection comprising, a main section rod member, an end section rod member, said rod members having semi-circular cooperable portions of a bearing to receive the crank, a fulcrum on the main rod member adjacent the end thereof, an oscillatory wrist pin member resting against said fulcrum, said main rod member and said wrist pin member being relatively cantable in a plane substantially transverse to the plane of oscillation of said wrist pin member but being oscillatory together about the axis of said wrist pin, locking means holding said main rod member and said wrist pin together for oscillatory movement, a strap extending around said wrist pin member along said rod members, a spring acting on said end section rod member and on said strap holding said sections together and also urging said wrist pin member against said fulcrum, and aligning keyways on said rod members receiving said strap.

RALPH W. DOEG.

REFERENCES CITED

The following references are of record in the file of this patent:

UNITED STATES PATENTS

| Number | Name | Date |
|---|---|---|
| 767,772 | Spalding | Aug. 16, 1904 |
| 1,734,244 | Bingman | Nov. 5, 1929 |
| 1,784,837 | Hiatt | Dec. 16, 1930 |
| 1,943,364 | Betz | Jan. 16, 1934 |
| 2,158,480 | Peterson | May 16, 1939 |

FOREIGN PATENTS

| Number | Country | Date |
|---|---|---|
| 7,980 of 1893 | Great Britain | Feb. 24, 1894 |